(12) United States Patent
Hovik et al.

(10) Patent No.: US 9,334,994 B2
(45) Date of Patent: May 10, 2016

(54) COUPLING DEVICE

(71) Applicants: Jon Hovik, Færvik (NO); Rients van der Woude, Risør (NO); Birger Oya, Eydehavn (NO); Tor Vidar Oya, Sundebru (NO); Ole-Magne Gilde, Arendal (NO)

(72) Inventors: Jon Hovik, Færvik (NO); Rients van der Woude, Risør (NO); Birger Oya, Eydehavn (NO); Tor Vidar Oya, Sundebru (NO); Ole-Magne Gilde, Arendal (NO)

(73) Assignee: MacGregor Pusnes AS, Arendal, NJ (US)

( * ) Notice: Subject to any disclaimer, the term of this patent is extended or adjusted under 35 U.S.C. 154(b) by 0 days.

(21) Appl. No.: 14/713,447

(22) Filed: May 15, 2015

(65) Prior Publication Data

US 2015/0247599 A1    Sep. 3, 2015

Related U.S. Application Data

(63) Continuation of application No. 13/322,278, filed as application No. PCT/NO2010/000188 on May 25, 2010, now Pat. No. 9,163,765.

(30) Foreign Application Priority Data

May 25, 2009   (NO) ................................... 20092011

(51) Int. Cl.
| | |
|---|---|
| B25B 1/04 | (2006.01) |
| F16L 37/12 | (2006.01) |
| B63B 27/24 | (2006.01) |
| B67D 9/02 | (2010.01) |
| F16L 37/62 | (2006.01) |
| E21B 43/013 | (2006.01) |

(52) U.S. Cl.
CPC ............. *F16L 37/1205* (2013.01); *B63B 27/24* (2013.01); *B67D 9/02* (2013.01); *F16L 37/12* (2013.01); *F16L 37/62* (2013.01); *E21B 43/013* (2013.01)

(58) Field of Classification Search
USPC ............................................... 29/238
See application file for complete search history.

(56) References Cited

U.S. PATENT DOCUMENTS

| | | | | | |
|---|---|---|---|---|---|
| 3,434,296 | A | * | 3/1969 | Geer ................... | E21B 43/0107 166/343 |
| 3,924,446 | A | * | 12/1975 | Baugh ....................... | F17D 5/00 73/37 |
| 4,102,146 | A | * | 7/1978 | Dietrich .................... | F16L 1/26 166/343 |
| 4,842,075 | A | * | 6/1989 | Kalvenes .................. | F16L 1/26 166/341 |
| 5,163,782 | A | * | 11/1992 | Paulo .................... | F16L 37/002 166/360 |
| 5,197,822 | A | * | 3/1993 | Parks ....................... | E02F 5/107 405/158 |
| 6,832,874 | B2 | * | 12/2004 | Appleford ............. | E21B 33/038 166/338 |
| 7,025,535 | B2 | * | 4/2006 | Chiesa ................ | E21B 43/0107 166/350 |

* cited by examiner

*Primary Examiner* — Lee D Wilson
*Assistant Examiner* — Alvin Grant
(74) *Attorney, Agent, or Firm* — Osha Liang LLP

(57) ABSTRACT

A coupling device for connecting a first coupling housing and a second coupling housing. The first coupling housing has a guiding element extending from the first coupling housing and having a free end at a distance (h) from the first coupling housing central axis (a-a). The second coupling housing has a receptacle for the guiding element and pull-in means for pulling the guiding element into the receptacle, said pull-in means being connected to the guiding element free end. The invention allows the first coupling housing to be pulled towards the receptacle at an angle which is not coincident with the central axis (a-a), and when the guiding element is in place inside the receptacle, the first coupling housing central axis (a-a) and the central axis (b-b) of the second coupling housing are aligned and coincident, and the two housings are rotationally aligned.

10 Claims, 12 Drawing Sheets

COUPLING DEVICE

FIELD OF THE INVENTION

The invention concerns the transfer of fluids between two vessels. More specifically, the invention concerns a connection device for transfer of fluids as set out in the introduction of claim 1. The invention is particularly useful in a system for offshore transfer of liquefied natural gas, for example between a production vessel and a shuttle tanker.

BACKGROUND OF THE INVENTION

The state of the art includes a system for offshore cryogenic loading, especially a system for transferring liquefied natural gas (hereinafter LNG) between two floating vessels. One such system is disclosed in WO 01/34460, describing a pull-in and connection unit comprising a pull-in funnel which comprises a slit and is mounted in an inclined position on the bow of the shuttle tanker. The funnel has an outwardly diverging, outer portion passing smoothly into a cylindrical inner portion, constituting a primary guide means for the coupling head. The funnel is also provided with a secondary guide means in the form of two longitudinally extending guide slots having a large width at the introduction opening and being inwardly converging to a width corresponding to holding arms for guide posts on the coupling head, so that the holding arms will slide in the guide slots whereas the guide posts will run at the outside of the funnel.

The state of the art system referred to above is designed for connecting several hoses in one operation. Thus the total masses subject to dynamic movement during connection may be considerable.

Further, this system is designed to be connected in a configuration with a predetermined angle of the hoses. Deviations from this angle may create large bending moments in the hoses. These bending moments will be introduced in the guideposts during entry of these. The guidepost systems do not have the functionality of establishing significant leverage for the aligning loads before these occur. This may create unacceptable resistance during pull-in.

The state of the art also includes US 2004/0011424 A1, which describes an alignment device having a cone 51 with a circular cross-section and two diametrically opposite side blades 55 which, when the cone 51 engages in a trumpet 44, house themselves in diametrically opposite side slits 56 provided in the front flared part of trumpet 44. The width of these slits becomes increasingly narrower on and after the blade reception end. Preferably, the alignment device comprises two alignment cones of cone 51 type arranged diametrically opposite one another along a horizontal plane and cooperating with two alignment trumpets of trumpet 44 type.

In this case, the fixing module would be equipped with two winches of type 47 or with one winch having two drums.

In the prior art, the pull-in wire is connected to the flexible pipe in such a fashion that the pull-in direction is more or less aligned with the longitudinal axis of the flexible pipe. The weight of the hose end assembly may create a significant deviation in angle between pulling rope and hose and eventually guide system. This may create problems at initial entering in the funnel. The slits which are present in the prior art coupling devices also represent a potential operational hazard or limitation, as the pull-in wire may be jammed into the slits, causing equipment damage and interruption of operations.

The present applicant has devised and embodied this invention to overcome the shortcomings and to obtain further advantages.

SUMMARY OF THE INVENTION

The invention is set forth and characterized in the main claim, while the dependent claims describe other characteristics of the invention.

The invention provides a coupling device for connecting a first coupling housing and a second coupling housing, characterized in that the first coupling housing comprises a guiding element extending from the first coupling housing and having a free end at a distance from the first coupling housing central axis, the second coupling housing comprises a receptacle for the guiding element and pull-in means for pulling the guiding element into the receptacle, said pull-in means being connected to the guiding element free end, whereby the first coupling housing is pulled towards the receptacle at an angle which is not coincident with the central axis, and when the guiding element is in place inside the receptacle, the first coupling housing central axis and the central axis of the second coupling housing are aligned and coincident, and the two housings are rotationally aligned.

In one embodiment, the guiding element head comprises a ball shape and a guiding element base portion having a substantially rectangular and slender cross-section, its long side extending along said axis.

In one embodiment, the receptacle comprises a rectangular bell-mouth shape.

In one embodiment, the cross-sectional shapes of the guiding element and the receptacle are non-circular, i.e. mainly rectangular, oblong, oval, triangular, etc., which provides sideways, longitudinal and rotational righting moments for the first coupling housing.

The pulling force exerted by the pull-in means is in a direction which is steeper than the first coupling housing central axis.

In one embodiment, the receptacle is arranged in a docking frame, and slidable between an extended position in which the guiding element may be pulled into the receptacle, and a retracted position in which the first coupling housing and the second coupling housing are connected.

Preferably, the first coupling housing is connected to a flexible pipe for transfer of LNG or evaporated LNG and the second coupling housing is connected to a pipe on a vessel, for transferring LNG or evaporated LNG between the flexible pipe and a storage tank on the vessel.

By applying the pulling force to the free end of the guide post, i.e. a distance from the longitudinal axis of the flexible pipe, a righting moment for the coupling head is achieved, which facilitates guide post entry into the guide post receptacle.

The geometry of the guide post, guide post receptacle and docking frame is such that the movements of the flexible pipe are aligned in the pull-in wire direction of movement, as opposed to the direction of the flexible pipe longitudinal axis.

The complementary cross-sectional shapes of the guide post and guide post receptacle are non-circular, i.e. mainly rectangular, oblong, oval, triangular, etc., which provides sideways, longitudinal and rotational righting moments for the flexible pipe and its coupling head.

The pulling force on the flexible pipe, as exerted by the pull-in wire, is in a direction which deviates from (preferably steeper than) that of the flexible pipe central axis in the region of the free end. The pull-in force is applied at a point which lies outside the flexible pipe central axis.

The guiding device according to the invention provides an alignment of pipe and coupling axes and a rotational alignment of the aligned axes.

BRIEF DESCRIPTION OF THE DRAWINGS

These and other characteristics of the invention will be clear from the following description of preferential forms of embodiment, given as non-restrictive examples, with reference to the attached drawings where like reference numbers relate to like components, and wherein:

FIG. 2a showing the guide post prior to entry into the guide post receptacle;

FIG. 2b showing the guide post inside the guide post receptacle and the receptacle being in a extended position; and FIG. 2c showing the guide post receptacle in a retracted position and the coupling in a connected state;

FIG. 4a showing the guide post prior to entry into the guide post receptacle;

FIG. 4b showing the guide post in a first position partly inside the guide post receptacle;

FIG. 4c showing the guide post in a second position partly inside the guide post receptacle; and FIG. 4d showing the guide post in an installed position inside the guide post receptacle and the coupling in a connected state;

Figure 5:
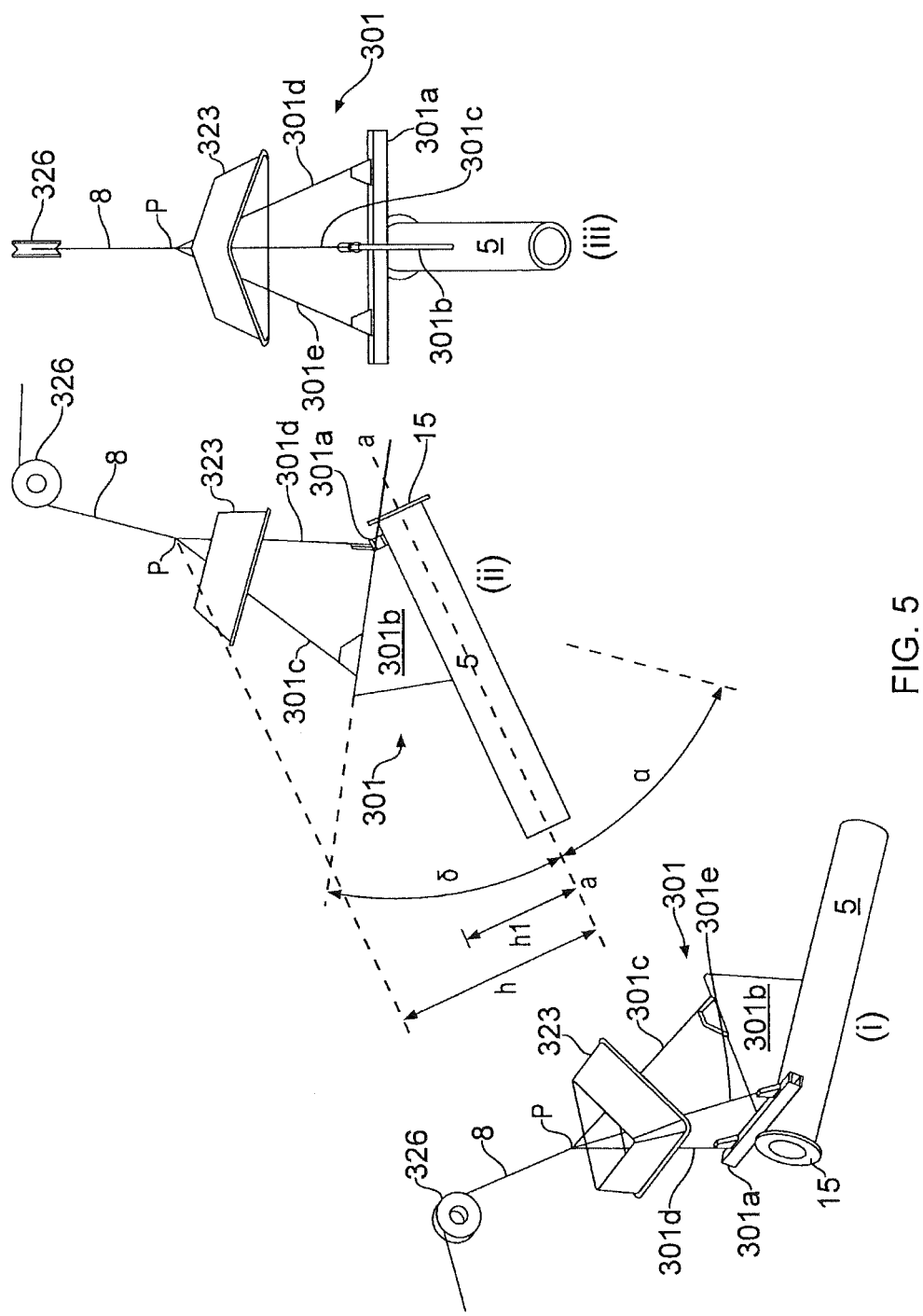
Figure 6:
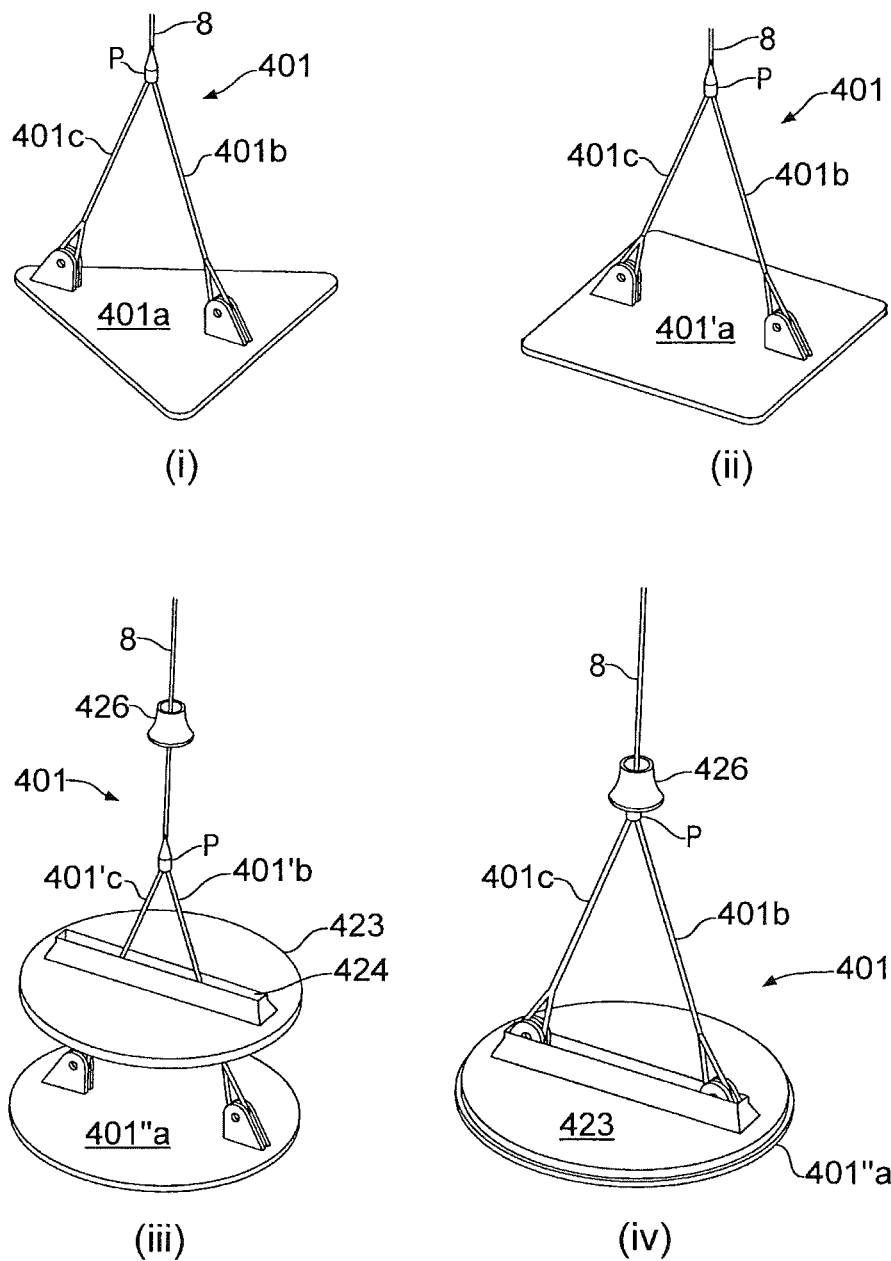

each of FIGS. 4a-d containing four drawings where drawings (i) and (ii) are perspective views, drawing (iii) is a side view, and drawing (iv) is a longitudinal sectional view drawing (iii);

FIG. 5 illustrates a third embodiment of the connection device according to the invention, containing three drawings where drawings (i) and (iii) are perspective views and drawing (ii) is a side view;

FIG. 6 illustrates a fourth embodiment of the invention, where drawings (i) and (ii) are perspective drawings of two variants of guide elements of this embodiment, and drawings (iii) and (iv) are drawings of a third variant of a guide element in cooperation with a guide element receptacle.

Figure 7:
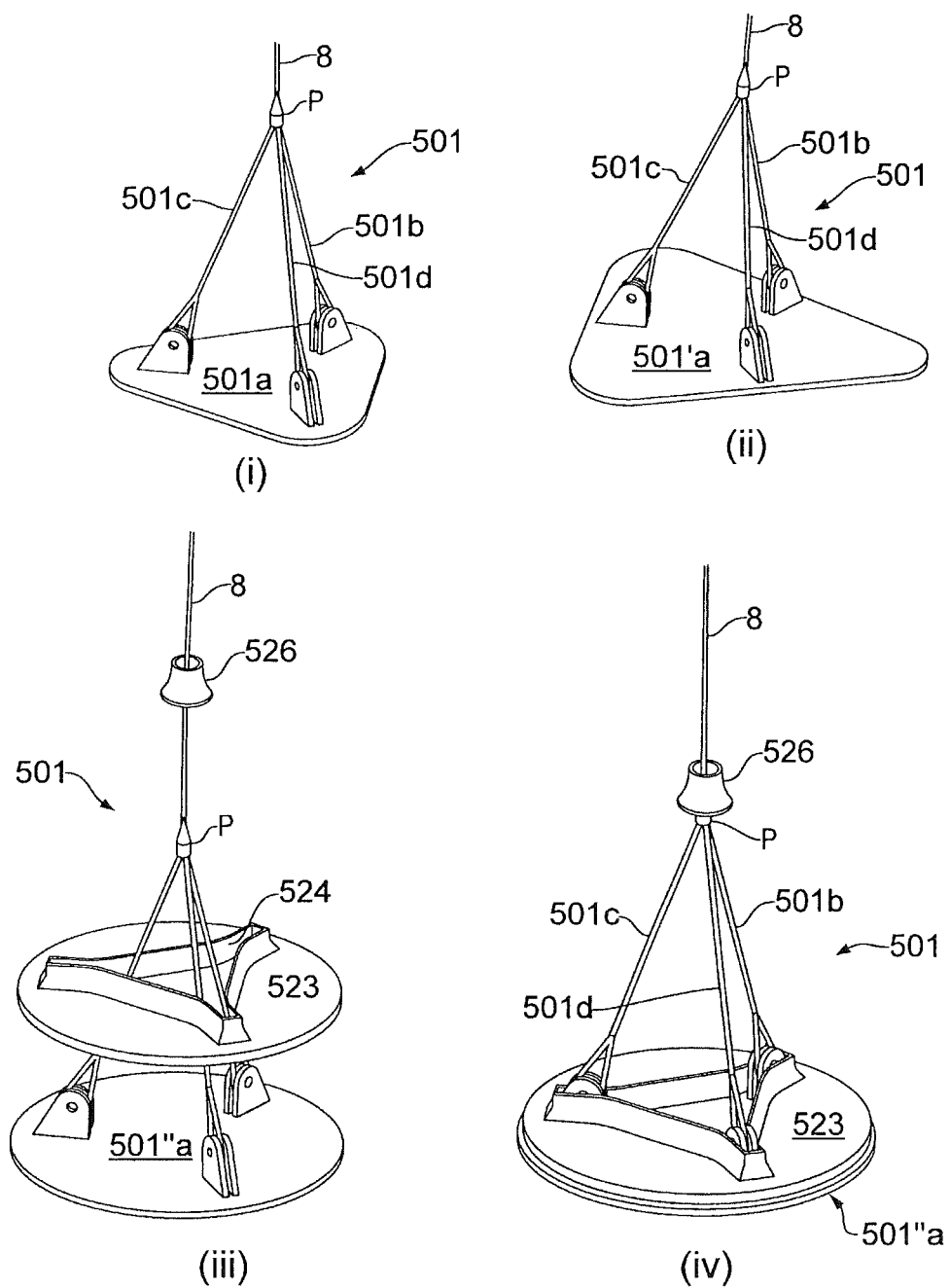

FIG. 7 illustrates a fifth embodiment of the invention, where drawings (i) and (ii) are perspective drawings of two variants of guide elements of this embodiment, and drawings (iii) and (iv) are drawings of a third variant of a guide element in cooperation with a guide element receptacle.

DETAILED DESCRIPTION OF PREFERENTIAL EMBODIMENTS

Figure 1A:
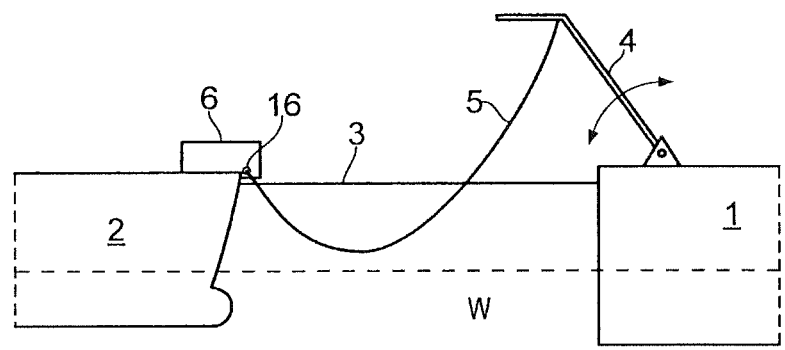
FIG. 1a is a principle sketch illustrating in a side view a system of two vessels moored to each other and having flexible pipes extending between them.
Figure 1B:
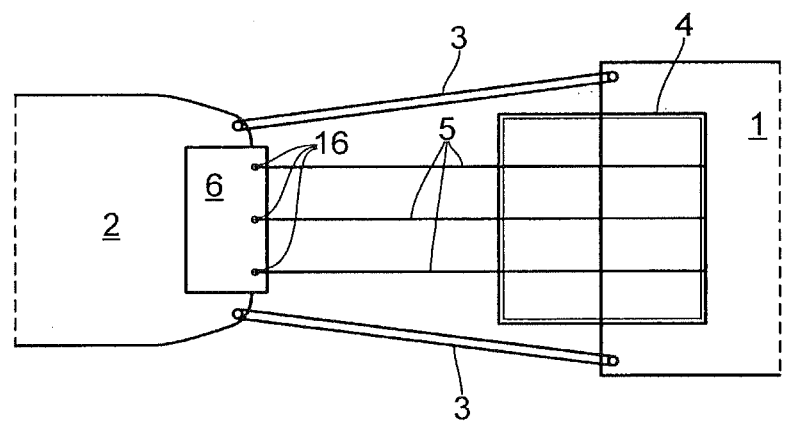
FIG. 1b is a principle sketch illustrating in a top view the system illustrated in FIG. 1.

FIGS. 1a and 1b are principle sketches illustrating an arrangement in which the connection device according to the invention may be used.

A production vessel 1 and a shuttle tanker 2 (of which only parts are shown) are floating in water W and moored to one another in a tandem configuration by means of a pair of double hawsers 3 in a crowfoot arrangement. The distance between the vessels may for example be maintained by the shuttle tanker 2 keeping a constant astern pulling force, thereby keeping the hawsers taut. The production vessel 1 may for example be a turret moored LNG FPSO, which may weathervane freely. This arrangement is well known in the art.

The production vessel 1 is fitted with a so-called A-frame 4, pivotally mounted to the deck of the production vessel as indicated by the double arrow in FIG. 1a. Three substantially parallel flexible pipes 5 extend between the vessels, two of which are designated for transferring LNG, whereas the third is designated for returning vaporized LNG (boil-off) from the shuttle tanker 2 to the production vessel 1. These pipes may for example be corrugated stainless steel vacuum insulated CRYODYN® flexible pipes The flexible pipes 5 are supported by a the A-frame 4 and each pipe 5 comprises at its free end a coupling head 16 to be introduced into a respective receptacles in a pull-in and connection unit 6 on the shuttle tanker 2.

In a typical pull-in and connection operation of the flexible pipes 5, the bow of the shuttle tanker 2 is equipped with pull-in winches (not shown) and receptacles, which will be described in the following. When the A-frame has been positioned with a suitable inclination, the three coupling heads 16 are (often simultaneously) hauled across from the production vessel 1 to the pull-in and connection unit 6 in the bow region on the shuttle tanker 2, and then pulled in and locked one by one. FIGS. 1a and 1b illustrate the flexible pipes 5 in such coupled and locked state, in which fluid transfer between the vessels may take place.

Each coupling head 16 comprises a connection flange 15, ball valve 12 and a swivel joint 10. In the pull-in and connection unit 6, there is one docking and connection unit for each coupling head 16, comprising a pull-in winch, coupling head 20 with connector and ball valve and a flange 21.

The invention concerns a connection device for transfer of fluids between the vessels, and the details of this connection device and the associated connection procedure will now be described in detail.

Description of a First Embodiment

A first embodiment of the invention will now be described with reference to FIGS. 2a-c and FIG. 3.

Figure 2A:
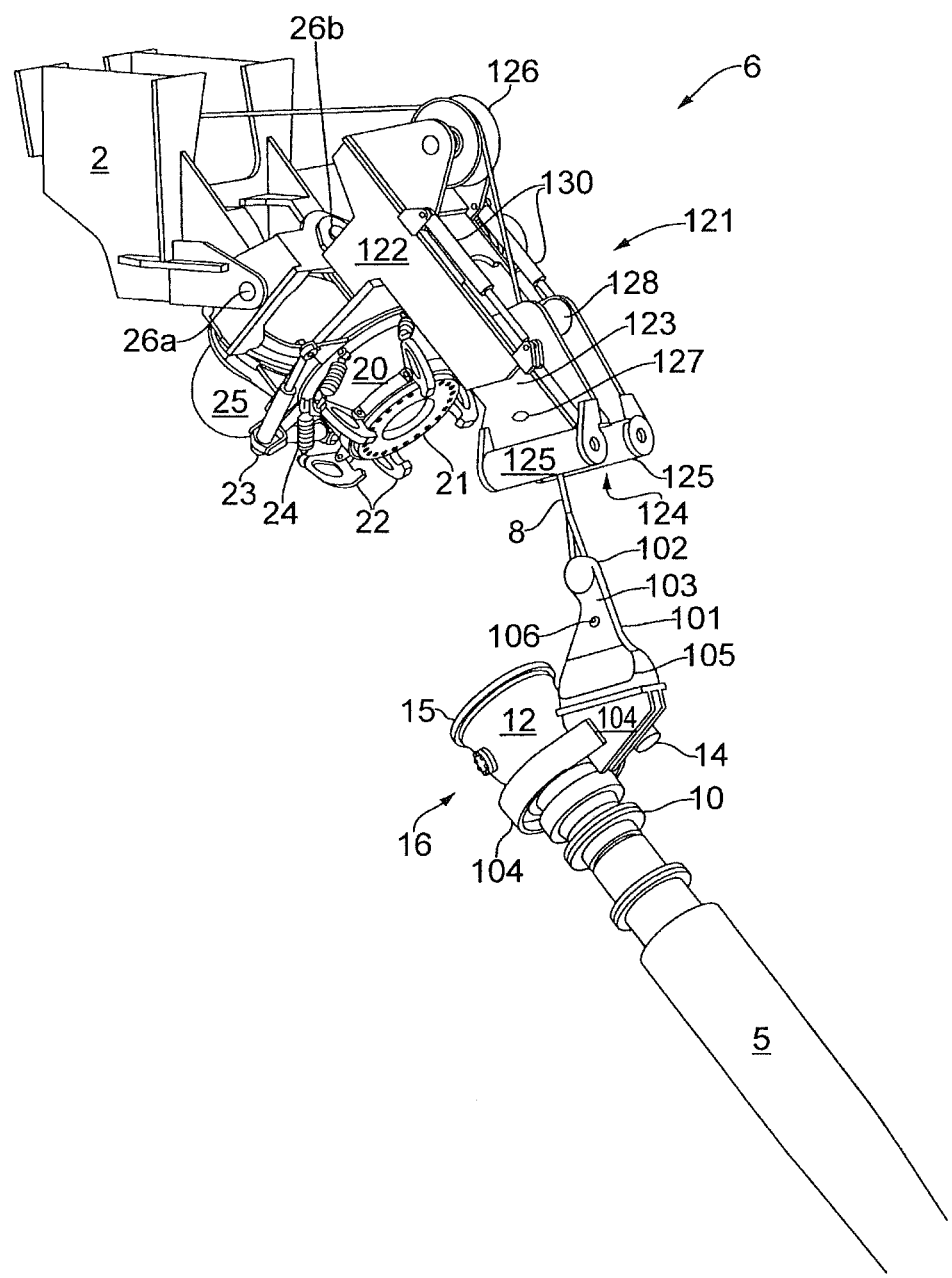
FIGS. 2a-c are perspective drawings illustrating a first embodiment of the connection device according to the invention, in three different states, i.e.
Figure 2B:
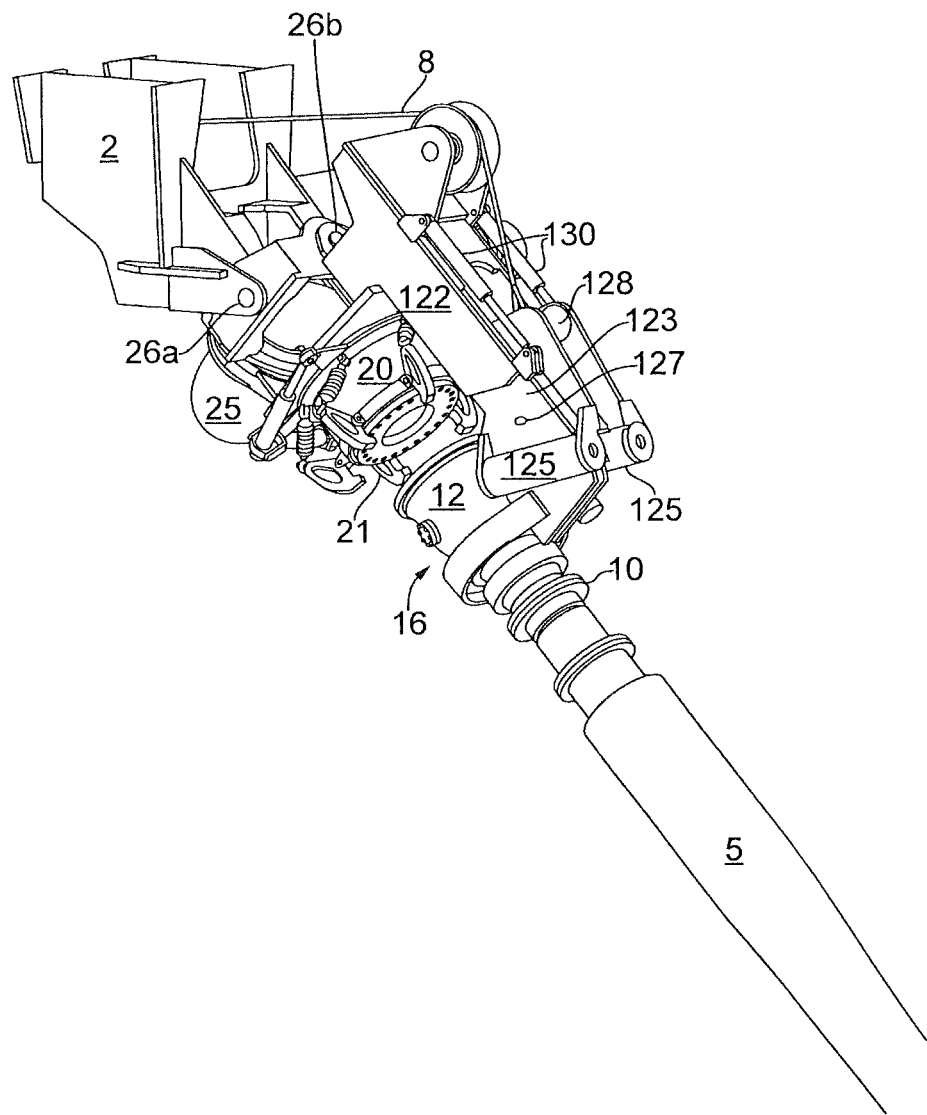
Figure 2C:
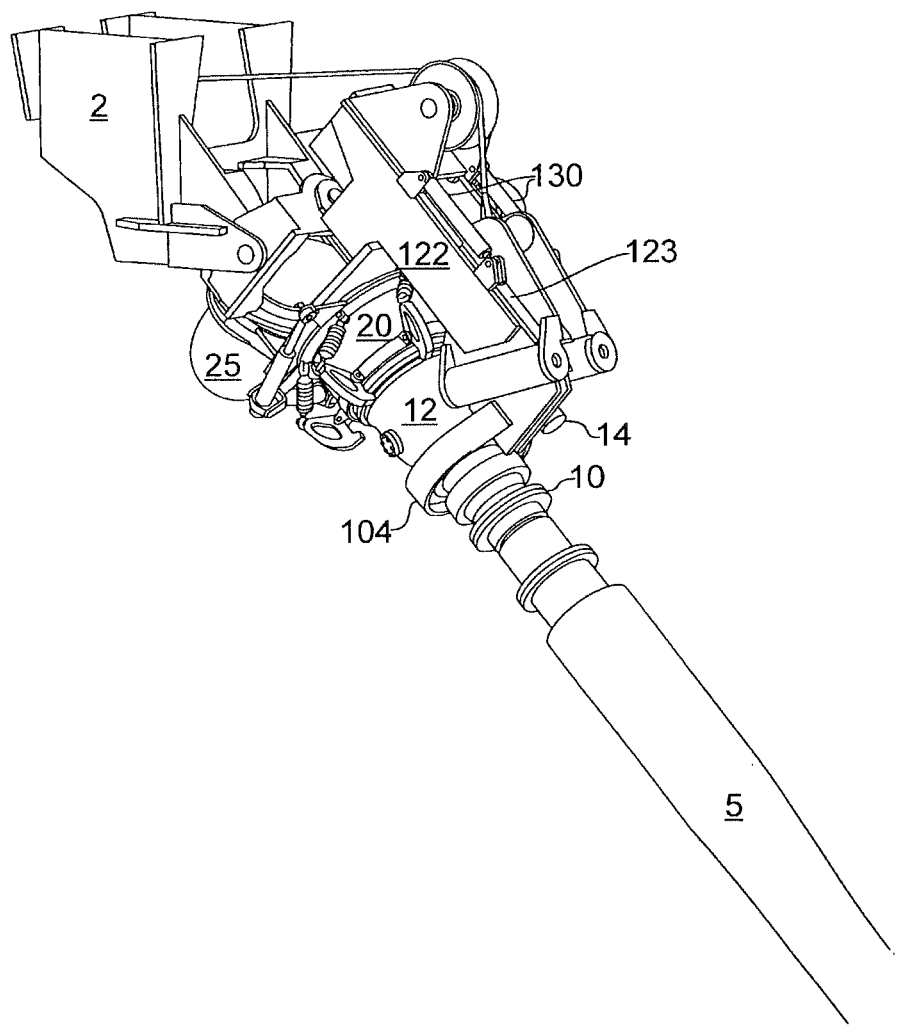

FIG. 2a illustrates a preliminary state of a connection process, where a coupling head 16 has been pulled by a pull-in wire 8 connected to a guide post 101, to a position near the pull-in and connection unit 6. As the skilled person will know, the other end of the pull-in wire 8 is connected to a conventional pull-in winch arrangement (not shown) on the shuttle tanker 2. In FIG. 2b, the guide post on the flexible pipe 5 has entered the pull-in and connection unit 6, and FIG. 2c shows the connection device in a coupled and locked state, i.e. the state which is schematically illustrated by FIGS. 1a,b.

Referring initially to FIG. 2a, the flexible pipe 5 is near its free end provided with a coupling head 16 comprising a ball valve housing 12 having a first flange 15 for connection to a corresponding second flange 21 on the coupling housing 20 on the shuttle tanker 2. The ball valve is opened by a valve actuator 14 upon connection, which is well known in the art.

The coupling head 16 furthermore comprises a guide post 101, connected to the flexible pipe by a suitable clamp arrangement 104. The guide post 101 comprises a head portion 102 at its outer free end; an inner base portion 105; and an intermediate middle neck portion 103. The guide post head 102 is comparably small, preferably in this embodiment comprising a ball shape. The base portion 105 has a substantially rectangular and slender cross-section, its long side extending along the central axis of the flexible pipe. The intermediate portion 103 also has a substantially rectangular and slender cross-section towards the base portion, and the side of the intermediate portion facing the valve housing 12 is substantially straight and aligned substantially parallel with the valve housing central axis (see FIG. 3). The coupling head 16 is connected to the flexible pipe 5 by via a swivel joint 10.

The pull-in and connection unit 6 is pivotally connected to the shuttle tanker 2 (only immediate support structure of shuttle tanker is shown in FIG. 2a) via a gimbal mounting 26a,b. This gimbal mounting (or, cardanic suspension) of the pull-in and connection unit 6 ensures a moment-free connection.

The gimbal mounting structure is designed to support the external loads from the hose and connector system. This structure is thermally insulated from the sometimes cold piping system at the mounting flange of the coupling housing 20. The rotational axis of the piping system are coinciding with the gimbals system axis at ambient temperature. The piping system is elastically arranged to allow for thermal deflections.

The coupling housing 20 comprises the aforementioned second flange 21, a plurality of locking claws 22, a locking actuator 23 and activation elements 24. When the first flange 15 is brought into contact with the second flange 21, the actuator 23 rotates the activation elements, whereby the locking claws 22 engage the first flange 15 and establishes the connection. At this stage, the valve actuator 14 is operated, the ball valves are opened and fluids may flow from the flexible pipe 5 and into the piping 25 on the shuttle tanker. This valve connector may be of a type which is known in the art, for example the "Bow Connector System" developed and sold by MIB Italiana S.p.a. In the figures, the piping 25 between the valve and the onboard storage tanks is only partially shown, as this is known in the art and not material for understanding the invention.

Arranged on the pull-in and connection unit 6 is a docking frame 122, in this embodiment having a pulley 126 for the pull-in wire 8. The docking frame 122 comprises a guide post receptacle 123, configured for accommodating and supporting at least a portion of the guide post 101, as is explained in more detail below. The guide post receptacle 123 is movable in the docking frame 122 between an extended position (illustrated by FIG. 2a) and a retracted position (illustrated by FIG. 2c). In the illustrated embodiment, this movement of the guide post receptacle 123 is that of reciprocation with respect to the docking frame 122, by means of one or more actuators 130. The receptacle actuators 130 may be hydraulic actuators or they may be threaded screw jacks. The guide post receptacle 123 comprises a hawse hole 124—into which also the guide post is pulled—and is conveniently equipped with a pair of guide rollers 125. FIG. 2a illustrates how the shape and positioning of the guide post 101 and the fact that the pull-in wire is connected to the guide post head 102, the direction of pull exerted on the flexible pipe 5 differs from the central axis of the flexible pipe. This ensures that a significant leverage arm is established before side loads are experienced and a righting moment is generated on the pipe and serves to align it in the final phase of to the guide post entering the guide post receptacle.

In FIG. 2b, the guide post 101 has been pulled inside the guide post receptacle 123 and locked in this position by a suitable lock arrangement, such as a pin (not shown) extending through corresponding holes 106, 127 in the guide post and the guide post receptacle, respectively. Such locking arrangement—which is known in the art and need not be described further—allows the tension in the pull-in wire 8 to be relieved, as the guide post 101 in this state is connected to the guide post receptacle 123. The guide post head 102, which is of a ball shape, is additionally supported by rollers 128a,b in the receptacle 123.

The interior of the guide post receptacle comprises a geometry which is complementary to the guide post geometry, explained above. The guide post receptacle comprises a substantially rectangular, funnel-shaped opening, for accommodating the substantially rectangular and slender cross-section of the base portion 105.

Figure 3:
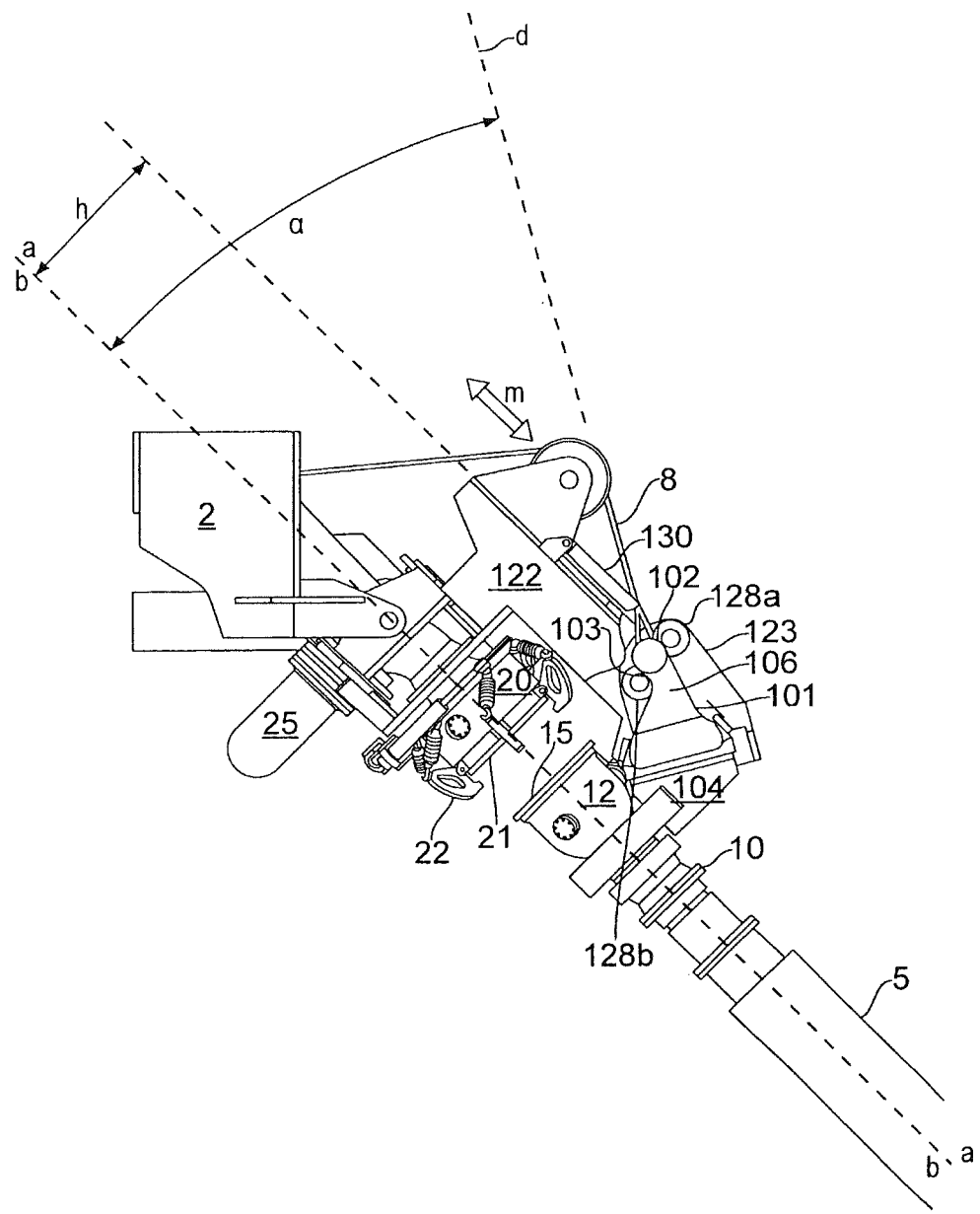
FIG. 3 is a partial cut-away side view of the connection device as illustrated in FIG. 2b.

The position illustrated in FIG. 2b is also illustrated in a side view and partial cut-away drawing in FIG. 3. FIG. 3 illustrates how the guide post head 102 is supported by the two rollers 128a,b, and how the side of the intermediate portion 103 which is facing the valve housing is aligned substantially parallel with the valve housing central axis and is being supported by the lower roller 128b. In addition to being advantageous for the pull-in and alignment operation, this feature is also particularly useful in a so-called "quick disconnect" situation, i.e. where the coupling head 16 is released by paying out or cutting the wire, without extending the slidable docking frame 122. This particular shape of the guide post (in this embodiment, the intermediate portion) ensures that the coupling head in will move away from the coupling housing 20 while initially following a path approximately parallel with the central axes a-a and b-b (see FIG. 3), before it falls out of and away from the receptacle 123. Therefore, a quick disconnect operation may be performed without the risk of damaging the valve flanges.

FIG. 3 also shows how the interior of the guide post receptacle 123 comprises a shape which is complementary to the shape of the guide post, thus ensuring that the central axis a-a of the flexible pipe 5 is aligned with the central axis b-b of the coupling housing 20. In other words, the two axes are coincident once the guide post is in place within the guide post receptacle.

FIG. 3 also illustrates how the guide post head 102—where the pull-in wire is attached—extends a distance h from the flexible pipe central axis a-a and how direction of pull by the pull-in wire deviates from the central axis a-a by an angle α.

The double arrow M in FIG. 3 indicates that the guide post receptacle 123 is movable back and forth in the docking frame 122, parallel to the central axis b-b.

Therefore, once the guide post 101 has been secured within the guide frame receptacle 123 as illustrated in FIGS. 2b and 3 and the two aforementioned axes a-a and b-b coincide, the two flanges 15, 21 may be mated in a safe and controlled manner by moving the guide post receptacle 123 to its retracted position and the coupling may be made up and locked as described above. At this stage, when the flexible pipe is aligned with the coupling housing 20, the two flanges 15, 21 may be prepared for mating, in that protective covers, etc. may be removed in a controlled and safe manner.

The made-up and locked state is illustrated by FIG. 2c, where the movable guide post receptacle 123 has been moved (by the actuators 130) to a retracted position in the docking frame, whereby the flanges are connected and locked.

Description of a Second Embodiment

A second embodiment of the invention will now be described with reference to FIGS. 4a-d. In these figures, which are principle sketches, only elements which are needed in order to explain the invention are shown. The skilled person will understand which ancillary components are required for a practical application, e.g. on the basis of information provided by FIGS. 1-3 and described in the foregoing.

Figure 4A:
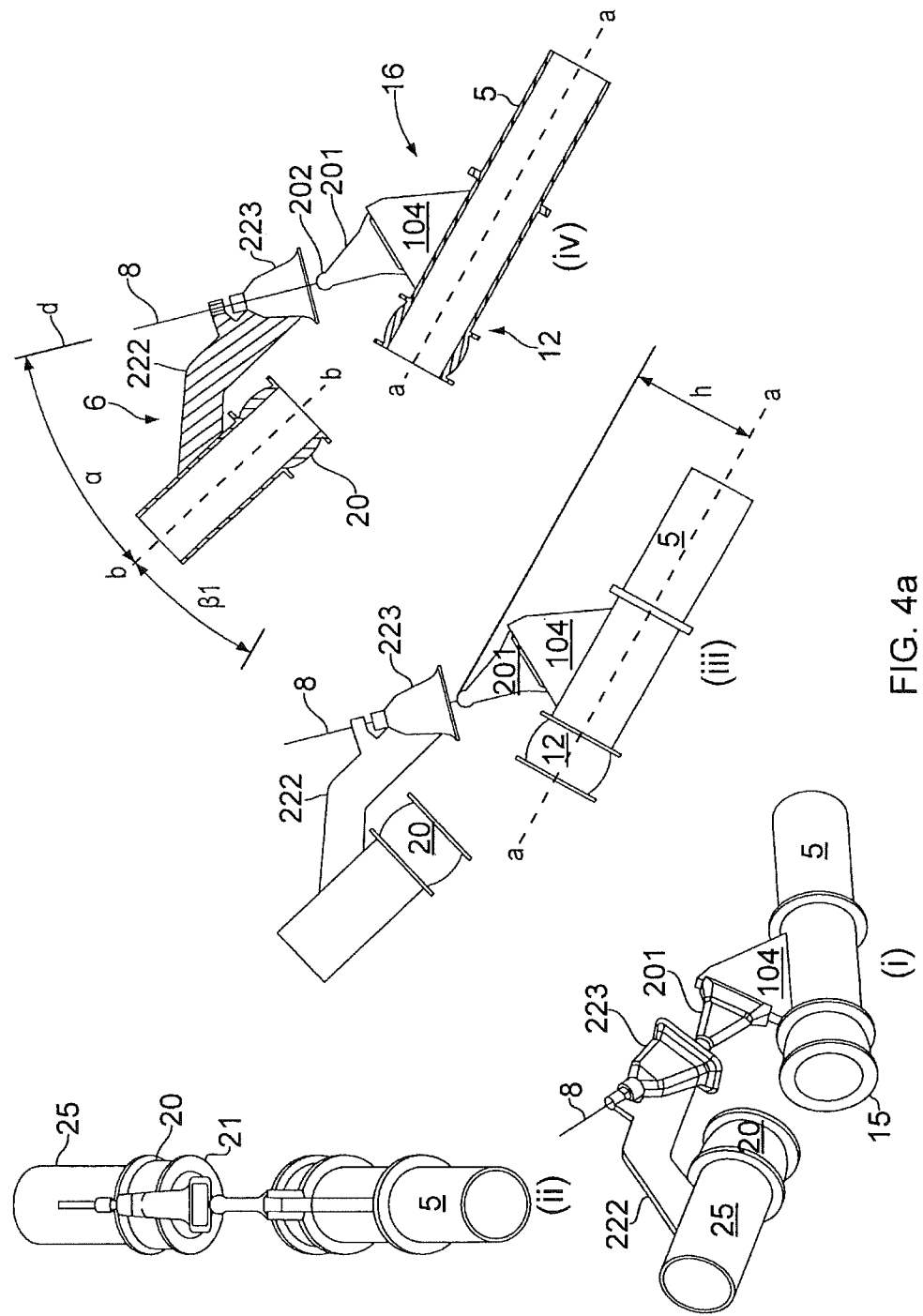
FIGS. 4a-d illustrate a second embodiment of the connection device according to the invention, in four different states, i.e.

FIG. 4a illustrates a preliminary state of a connection process, where the pull-in wire 8 attached to the guide post 201 has pulled the flexible pipe 5 to a position in the proximity of the pull-in and connection unit 6. As in the first embodiment, the guide post 201 extends a distance h from the flexible pipe central axis a-a (see drawing (iii)), and the pull-in wire 8 is attached to the guide post 201 free end, or head 202. As in the first embodiment, the angle of pull on the flexible pipe deviates from the central axis of the flexible pipe.

In this second embodiment, the pull-in and connection unit 6 comprises a guide post receptacle 223 which is stationary with respect to the docking frame 222. However, the guide post receptacle 223 may also be slidably arranged with respect to the docking frame 222; similar to the arrangement in the first embodiment.

In this second embodiment, the guide post 201 and the guide post receptacle 223 comprise complementary a bell mouth shapes. As illustrated particularly in drawing (i), the guide post receptacle 223 is of a non-circular shape, more precisely a substantially rectangular shape, the length of the cross-section being substantially parallel with the central axis b-b of the coupling housing 20. The guide post receptacle 223 central axis d and the central axis b-b of the coupling housing 20 are non-parallel with respect to each other, i.e. having an angle $\alpha$ between them, where $0°<\alpha<90°$. For a particular loading system, this angle is estimated based on flexible pipe and coupling system weights and stiffness. Typically, $15°<\alpha<35°$.

Similarly, the guide post 201 is of a shape complementary to that of the guide post receptacle 223, the length of the guide post cross-section being substantially parallel with the central axis a-a of the flexible pipe 5. In the state illustrated in FIG. 4a, the central axis a-a of the flexible pipe is at an angle $\beta_1$ with the central axis b-b of the coupling housing 20.

Figure 4B:
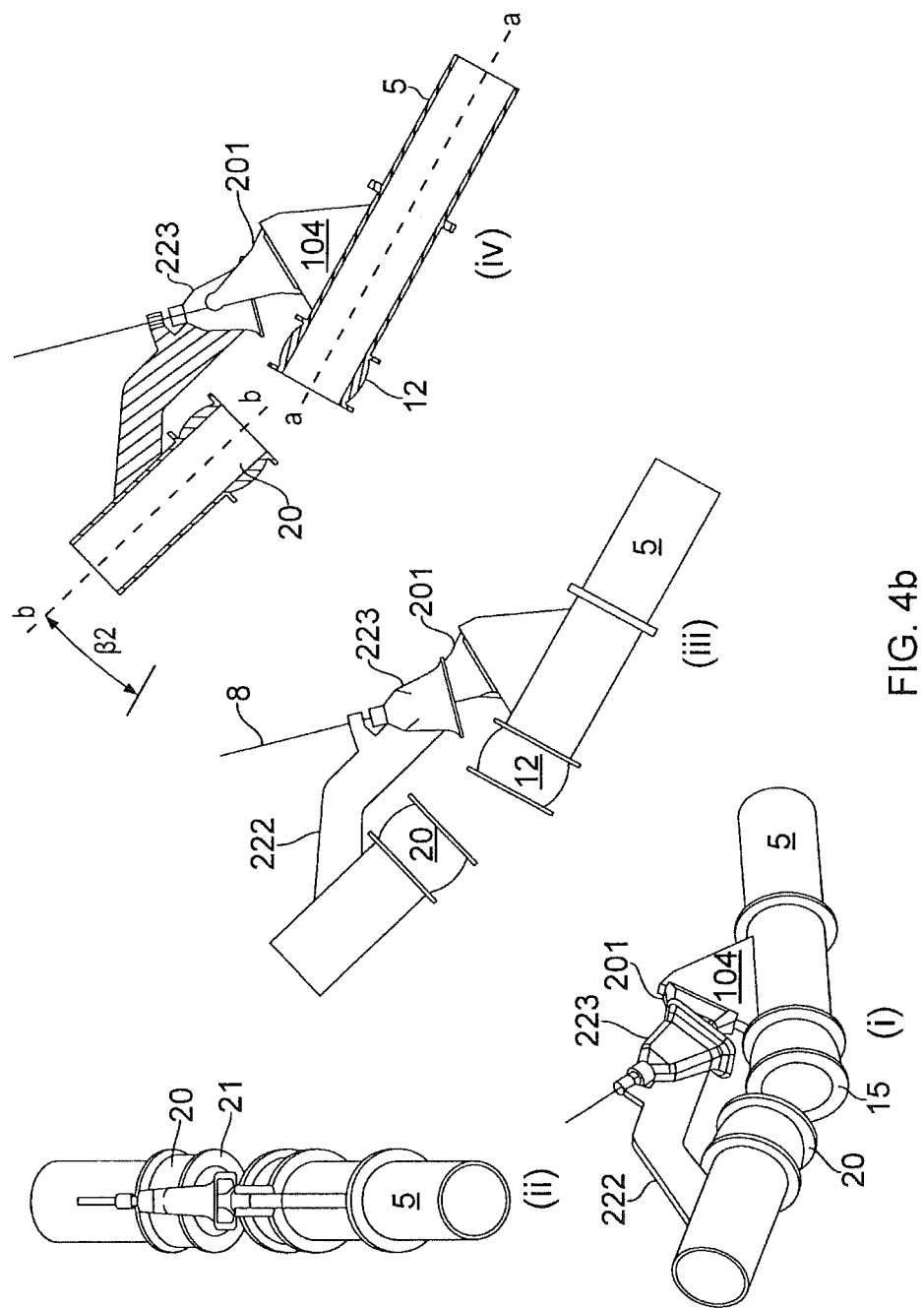

In FIG. 4b, the guide post 201 has entered the guide post receptacle 223. The aforementioned rectangular shapes ensure sideways alignment of the flexible pipe 5 with respect to the coupling housing 20, i.e. into the same vertical plane. Also, the aforementioned bell mouth shapes serve to reduce the angle between the central axes a-a and b-b. Thus, in this state, the central axis a-a of the flexible pipe is at an angle $\beta_2$ with the central axis b-b of the coupling housing 20, and $\beta_2<\beta_1$.

Figure 4C:
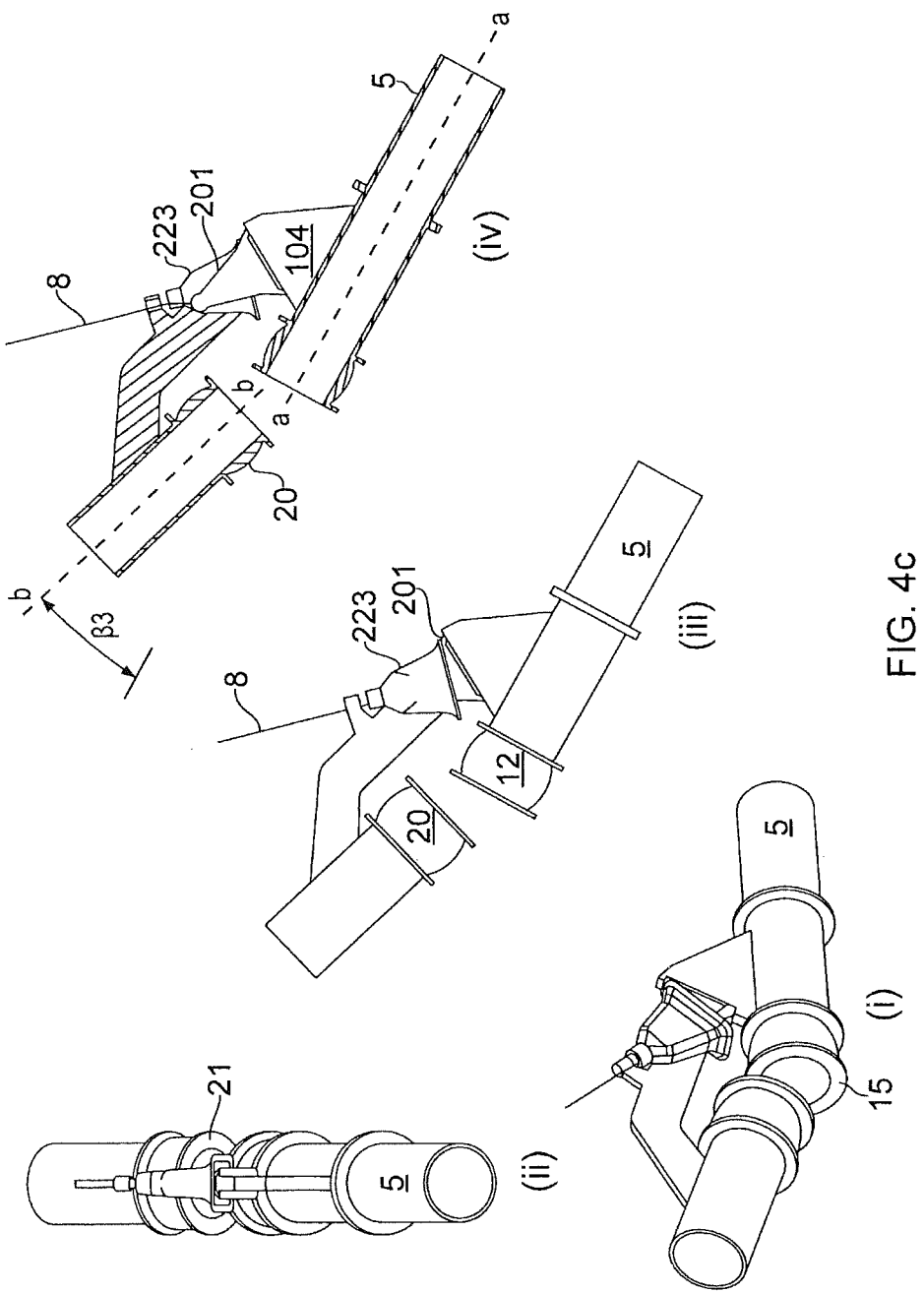

In the state illustrated in FIG. 4c, the guide post 201 has been pulled further into the guide post receptacle 223, and the lower parts of the two components cooperate to pivot the flexible pipe 5, i.e. such that the central axis a-a assumes an angle $\beta_3$ with the central axis b-b, where $\beta_3<\beta_2$.

Figure 4D:
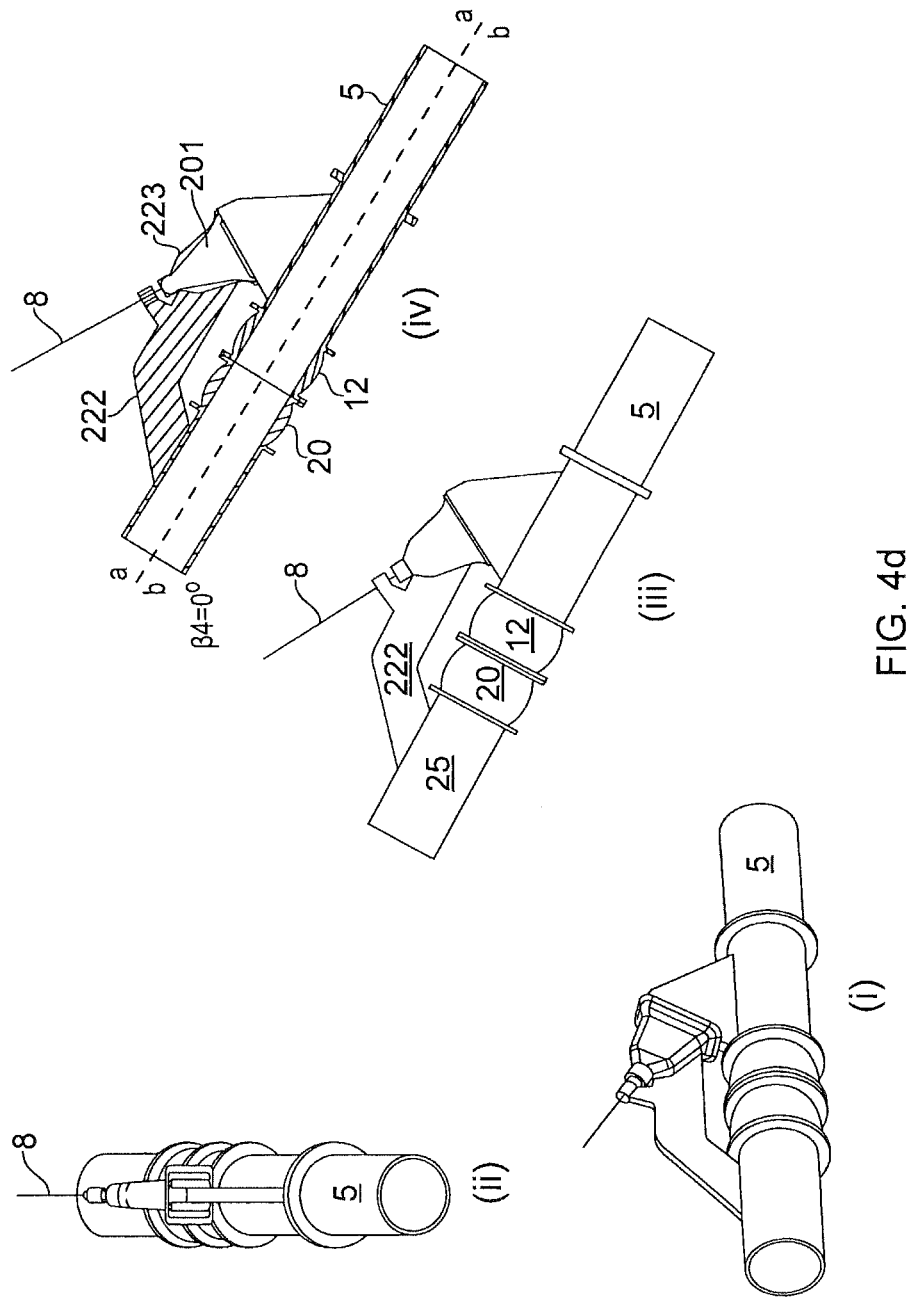

In the state illustrated in FIG. 4d, the guide post has been pulled completely into the guide post receptacle 223, the first flange 15 and the second flange 21 have been mated, and the connection is complete. In this state, the axis a-a of the flexible pipe is at an angle $\beta_4=0°$ with the central axis b-b of the coupling housing 20, i.e. the two axes are aligned. The guide post may preferably be locked to the guide post receptacle in this position, by means of a locking pin (not shown) or a similar locking device known in the art.

Description of a Third Embodiment

A third embodiment of the invention will now be described with reference to FIG. 5. In this figure, which contain principle sketches, only elements which are needed in order to explain the invention are shown. The skilled person will understand which ancillary components are required for a practical application, e.g. on the basis of information provided by FIGS. 1-4 and described in the foregoing.

FIG. 5 illustrates a preliminary state of a connection process. The pull-in wire 8 runs through a receptacle 323, around a pulley 326 and on to a pull-in winch (not shown). The skilled person will understand that the receptacle 323 is attached to, and a part of, the pull-in and connection unit 6 described above.

In this third embodiment, the guide on the flexible pipe comprises a guide arrangement 301 attached to the flexible pipe 5. The guide arrangement 301 comprises:
a beam 301a, arranged transversely to the flexible pipe's 5 central axis a-a,
a plate element 301b arranged in alignment with the central axis a-a and having a rake angle $\delta$ with respect to the central axis a-a; its peak extending a distance $h_1$ from said central axis; and
three wire segments 301c,d,e; the first wire segment 301c being attached to the plate element 301b near said peak; the second 301d and third 301e wire segments being attached to respective ends of said transverse beam 301a; and all three wire segments being connected to the pull-in wire 8 at a common juncture P extending a distance h above the central axis a-a. Functionally, this juncture P is similar to the guide post head 102 described above.

Thus, with this configuration—and as in the first and second embodiments—the angle of pull on the flexible pipe deviates from the central axis of the flexible pipe.

Description of a Fourth Embodiment

A fourth embodiment of the invention will now be described with reference to FIG. 6. In this figure, which contain principle sketches, only elements which are needed in order to explain the invention are shown. The skilled person will understand which ancillary components are required for a practical application, e.g. on the basis of information provided by FIGS. 1-4 and described in the foregoing.

In this fourth embodiment, the guide on the flexible pipe comprises a guide arrangement 401 attached to the flexible pipe (pipe not shown in FIG. 6). Drawing (i) shows a triangular shaped plate 401a, drawing (ii) shows a rectangular shaped plate 401'a, and drawing (iii) shows a circular shaped plate 401"a. The plates are connected to the pull-in wire 8 via two wire segments 401b,c which meet at the juncture P and are attached in a spaced-apart relationship to the plate.

Drawing (iii) of FIG. 6 illustrates how the pull-in wire 8 runs through a receptacle 423, through a guide ring 426 and on to a pull-in winch (not shown). The skilled person will understand that the receptacle 423 and the guide ring 426 are attached to, and a part of, the pull-in and connection unit 6 described above.

Drawing (iv) of FIG. 6 illustrates the state when the guide arrangement 401 has been pulled completely into the receptacle 423, the wire segments 401b,c having exerted a righting moment on the plate 401"a attached to the flexible pipe (not shown in FIG. 6) and the flexible pipe thus having been aligned with the pull-in and connection unit described above.

Description of a Fifth Embodiment

A fifth embodiment of the invention will now be described with reference to FIG. 7. In this figure, which contain principle sketches, only elements which are needed in order to explain the invention are shown. The skilled person will understand which ancillary components are required for a practical application, e.g. on the basis of information provided by FIGS. 1-4 and described in the foregoing.

In this fifth embodiment, the guide on the flexible pipe comprises a guide arrangement 501 attached to the flexible pipe (pipe not shown in FIG. 7). Drawings (i) and (ii) show triangular shaped plates 501a, 501'a, and drawing (iii) shows a circular shaped plate 501"a. The plates are connected to the pull-in wire 8 via three wire segments 501*b,c,d* which meet at the juncture P and are attached in a triangular spaced-apart relationship to the plate.

Drawing (iii) of FIG. 7 illustrates how the pull-in wire 8 runs through a receptacle 523, through a guide ring 526 and on to a pull-in winch (not shown). The skilled person will understand that the receptacle 523 and the guide ring 526 are attached to, and a part of, the pull-in and connection unit 6 described above.

Drawing (iv) of FIG. 7 illustrates the state when the guide arrangement 501 has been pulled completely into the receptacle 523, the wire segments 501*b,c,d* having exerted a righting moment on the plate 501"*a* attached to the flexible pipe (not shown in FIG. 6) and the flexible pipe thus having been aligned with the pull-in and connection unit described above.

Common to All Embodiments

Although the invention has been described with reference to a system where the pull-in and connection unit 6 is mounted on the shuttle tanker 2 and the flexible pipe 5 free end is being fed from the production vessel 1, the skilled person will understand that the invention will be equally applicable for a reverse configuration, i.e. where the pull-in and connection unit is mounted on the production vessel.

Although the invention has been described with reference to a system for offshore transfer of LNG between a production vessel and a shuttle tanker, the skilled person will understand that the connection device according to the invention also may be employed in other LNG systems, such as between a sea-going vessel and an onshore plant, or between other vessels on land or at sea. The skilled person will also understand that the invention is useful also for other fluids than LNG.

Although the invention is particularly useful for systems having comparably stiff flexible pipes 5, the invented connection device is applicable for pipes of any stiffness.

The invention claimed is:

1. A coupling device comprising:
    a first coupling housing comprising a guiding element extending from the first coupling housing and having a free end at a distance (h) from a first coupling housing central axis (a-a), at least a portion of the guiding element having a non-circular cross-section; and
    a second coupling housing comprising a receptacle for the guiding element and pull-in means for pulling the guiding element into the receptacle, said pull-in means being connected to the guiding element free end, at least a portion of the receptacle having a non-circular cross-section of a shape which is complementary with the guiding element non-circular portion, such that the movement of the first coupling housing towards the receptacle is at an angle which is not coincident with the central axis (a-a), and when the guiding element is in place inside the receptacle, the first coupling housing central axis (a-a) and a central axis (b-b) of the second coupling housing are aligned and coincident, and the two housings are rotationally aligned,
    wherein at least a portion of the guiding element is movably supported by support elements of the receptacle, the portion and elements being shaped such that the first coupling housing is movable with respect to the second coupling housing while the first coupling housing central axis (a-a) and the second coupling housing central axis (b-b) are substantially parallel.

2. The coupling device of claim 1, wherein the first coupling housing central axis (a-a) and the second coupling housing central axis (b-b) are substantially coincident.

3. The coupling device of claim 1, wherein the guiding element free end comprises a ball shape and a guiding element base portion having a substantially rectangular and slender cross-section, a long side of the guiding element free end extends along said axis (a-a).

4. The coupling device of claim 1, wherein the receptacle comprises a rectangular bell-mouth shape.

5. The coupling device of claim 1, wherein the non-circular cross-sections comprise rectangular, oblong, oval, triangular, etc., whereby sideways, longitudinal and rotational righting moments for the first coupling housing are provided.

6. The coupling device of claim 1, wherein the pulling force exerted by the pull-in means is in a direction which is steeper than the first coupling housing central axis.

7. The coupling device of claim 6, wherein the at least a portion of the guiding element comprises a face which is aligned substantially parallel with the axes.

8. The coupling device of claim 1, wherein the receptacle is arranged in a docking frame, and slidable in the docking frame between an extended position in which the guiding element may be pulled into the receptacle, and a retracted position in which the first coupling housing and the second coupling housing are connected.

9. The coupling device of claim 8, wherein the guiding element is locked in the receptacle prior to retracting to the position in which the coupling housing and the second coupling housing are connected.

10. The coupling device of claim 1, wherein the first coupling housing is connected to a flexible pipe for transfer of LNG or evaporated LNG and the second coupling housing is connected to a pipe on a vessel, for transferring LNG or evaporated LNG between the flexible pipe and a storage tank on the vessel.

* * * * *